US006716891B1

(12) United States Patent
Meisenburg et al.

(10) Patent No.: US 6,716,891 B1
(45) Date of Patent: Apr. 6, 2004

(54) COATING MATERIAL THAT CAN BE CURED THERMALLY OR BY ACTINIC RADIATION, AND ITS USE

(75) Inventors: Uwe Meisenburg, Duisburg (DE); Heinz-Peter Rink, Münster (DE); Karl-Heinz Joost, Drensteinfurt (DE); Hubert Baumgart, Münster (DE)

(73) Assignee: BASF Coatings AG, Munster (DE)

( * ) Notice: Subject to any disclaimer, the term of this patent is extended or adjusted under 35 U.S.C. 154(b) by 0 days.

(21) Appl. No.: 09/926,532

(22) PCT Filed: May 26, 2000

(86) PCT No.: PCT/EP00/04807
§ 371 (c)(1),
(2), (4) Date: Nov. 16, 2001

(87) PCT Pub. No.: WO00/73395
PCT Pub. Date: Dec. 7, 2000

(30) Foreign Application Priority Data

May 29, 1999 (DE) .......................... 199 24 674

(51) Int. Cl.$^7$ .............................. C08F 2/46; C09D 5/00; C09D 163/00; C09D 167/00; C09D 175/16
(52) U.S. Cl. .................. 522/90; 522/104; 522/127; 522/129; 522/134; 522/146; 522/170; 522/172; 522/173; 522/174; 522/175; 522/179; 522/180; 522/181; 522/178; 522/168; 522/182; 522/183; 528/29; 528/75; 528/85; 528/205; 528/376; 528/418; 528/425; 428/423.1; 428/413; 428/419; 428/482; 428/500
(58) Field of Search .................. 528/25, 29, 75, 528/85, 205, 376, 418, 425; 522/90, 104, 127, 129, 134, 146, 168, 170, 172, 173, 174, 175, 179, 180, 181, 182, 183, 96, 178; 428/423.1, 482, 500, 413, 419

(56) References Cited

U.S. PATENT DOCUMENTS

| | | |
|---|---|---|
| 4,013,806 A | 3/1977 | Volkert et al. ................. 427/54 |
| 4,025,407 A | 5/1977 | Chang et al. .......... 204/159.14 |
| 4,128,600 A | 12/1978 | Skinner et al. ............. 260/859 |
| 4,139,385 A | 2/1979 | Crivello ...................... 96/35.1 |
| 4,192,762 A | 3/1980 | Osborn et al. ............ 252/182 |
| 4,212,901 A | 7/1980 | van Neerbos et al. ..... 427/53.1 |
| 4,247,578 A | 1/1981 | Skinner et al. ............... 427/44 |
| 4,268,542 A | 5/1981 | Sakakibara et al. ......... 427/195 |
| 4,287,116 A | 9/1981 | Burns .......................... 260/37 |
| 4,342,793 A | 8/1982 | Skinner et al. ............... 427/44 |
| 4,377,457 A | 3/1983 | Boeckeler et al. ..... 204/159.16 |
| 4,415,604 A | 11/1983 | Nativi ...................... 427/54.1 |
| 4,424,252 A | 1/1984 | Nativi ........................ 428/209 |
| 4,481,093 A | 11/1984 | Murphy et al. ........ 204/159.19 |
| 4,526,939 A | 7/1985 | Lewarchik et al. ......... 525/438 |
| 4,532,021 A | 7/1985 | Murphy et al. ............. 204/159 |
| 4,607,084 A | 8/1986 | Morris ....................... 525/454 |
| 4,618,632 A | 10/1986 | Su .............................. 522/43 |
| 4,634,602 A | 1/1987 | Sirkoch et al. ............... 427/44 |
| 4,675,234 A | 6/1987 | Sachs et al. ................. 428/328 |
| 4,746,366 A | 5/1988 | Philipp et al. ......... 106/287.19 |
| 4,761,435 A | 8/1988 | Murphy et al. ............... 522/46 |
| 4,786,657 A | 11/1988 | Hammer et al. .............. 522/90 |
| 4,952,612 A | 8/1990 | Brown-Wensley et al. ... 522/25 |
| 4,985,340 A | 1/1991 | Palazzotto et al. .......... 430/270 |
| 5,013,631 A | 5/1991 | Su ............................. 430/271 |
| 5,089,376 A | * 2/1992 | Setthachayanon ........ 430/284.1 |
| 5,153,101 A | 10/1992 | Meire et al. ................. 430/281 |
| 5,234,970 A | 8/1993 | Kyle ............................ 522/96 |
| 5,326,621 A | 7/1994 | Palazzotto et al. .......... 428/195 |
| 5,356,669 A | 10/1994 | Rehfuss et al. .......... 427/407.1 |
| 5,409,740 A | 4/1995 | Brann ........................ 427/513 |
| 5,425,970 A | 6/1995 | Lahrmann et al. .......... 427/493 |
| 5,453,451 A | 9/1995 | Sokol ........................... 522/42 |
| 5,462,797 A | 10/1995 | Williams et al. ............ 428/345 |
| 5,474,811 A | 12/1995 | Rehfuss et al. .......... 427/407.1 |
| 5,580,614 A | 12/1996 | Amberg-Schwab et al. 427/493 |
| 5,601,878 A | 2/1997 | Kranig et al. ............... 427/386 |

(List continued on next page.)

FOREIGN PATENT DOCUMENTS

CA    2 073 116    7/1992    ........... C08L/75/14

(List continued on next page.)

OTHER PUBLICATIONS

English Abstract for DE3828098 from EPO, Mar. 4, 1990.
English Abstract for DE4011045 from EPO, Oct. 9, 1991.
English Abstract for DE40203136 from EPO, Jan. 9, 1992.
English Abstract for DE4025215 from EPO, Feb. 19, 1992.
English Abstract for JP06–286008 from EPO, Oct. 11, 1994.
Aaron Lockhart, Bayer Polymers, Pittsburgh, PA, dated Jun. 9–11, 2003.
English Language Abstract for DE 198 26 715.

Primary Examiner—Susan Berman

(57) ABSTRACT

The invention relates to a coating material that can be cured thermally or by actinic radiation and that contains at least one component (a1) with at least two functional groups (a11) which serve for cross-linking, by actinic radiation, and at least one functional group (a12) that can enter into thermal cross-linking reactions with the hydroxyl and/or thiol groups (a21) in component (a2), at least one branched cyclic and/or acyclic $C_9$–$C_{16}$ alkane (a2)) that is functionalized with at least two hydroxyl or thiol groups (a21) or with at least one hydroxyl and at least one thiol group, and optionally at least one photo initiator (a3), at least one initiator of the thermal cross-linking reaction (a4), at least one reactive diluent that is cured by actinic radiation and/or thermafly, at least one lacquer additive (a6), at least one thermally curable component (a7) and/or at least one organic solvent (a8). The inventive coating material is used to produce transparent lacquers and multi-layer chromophor and/or effect lacquers.

17 Claims, No Drawings

U.S. PATENT DOCUMENTS

| | | | |
|---|---|---|---|
| 5,605,965 A | 2/1997 | Rehfuss et al. | 525/100 |
| 5,610,224 A | 3/1997 | DePue et al. | 524/538 |
| 5,626,958 A | 5/1997 | D'Herbecourt et al. | 428/327 |
| 5,691,419 A | 11/1997 | Engelke et al. | 525/208 |
| 5,716,678 A | 2/1998 | Röckrath et al. | 427/407.1 |
| 5,922,473 A | 7/1999 | Muthiah et al. | 428/481 |
| 5,965,213 A | 10/1999 | Sacharski et al. | 427/475 |
| 6,017,640 A | 1/2000 | Muthiah et al. | 428/514 |
| 6,159,556 A | 12/2000 | Möller et al. | 427/475 |
| 6,177,535 B1 | 1/2001 | Schwalm et al. | 528/49 |
| 6,242,101 B1 * | 6/2001 | Schwalm et al. | 428/425.8 |
| 6,265,476 B1 | 7/2001 | Krongauz et al. | 524/262 |
| 6,332,291 B1 | 12/2001 | Flosbach et al. | 52/91 |
| 6,333,077 B1 | 12/2001 | Maag et al. | 427/496 |
| 6,335,397 B1 | 1/2002 | Kokel et al. | 524/507 |
| 6,344,501 B1 | 2/2002 | Sierakowski et al. | 523/410 |
| 6,476,121 B1 * | 11/2002 | Kadambande et al. | 524/560 |
| 6,482,869 B1 * | 11/2002 | Bolte et al. | 522/35 |
| 6,534,187 B2 | 3/2003 | Kron et al. | 428/447 |
| 2003/0023017 A1 * | 1/2003 | Rink et al. | |
| 2003/0077394 A1 | 4/2003 | Bradford et al. | 427/407.1 |
| 2003/0078315 A1 | 4/2003 | Bradford et al. | 522/126 |
| 2003/0078316 A1 | 4/2003 | Bradford et al. | 522/126 |
| 2003/0083397 A1 | 5/2003 | Bradford et al. | 522/173 |

FOREIGN PATENT DOCUMENTS

| | | | |
|---|---|---|---|
| CA | 2079498 | 8/2001 | B05D/3/06 |
| DE | 198 26 715 A1 | 1/1999 | C07C/69/54 |
| DE | 199 20 799 | 11/2000 | C09D/175/00 |
| DE | 199 20 801 | 11/2000 | B05D/7/24 |
| DE | 199 30 067 | 1/2001 | C09D/133/04 |
| DE | 199 30 664 | 1/2001 | C09D/125/02 |
| DE | 199 30 665 | 1/2001 | C09D/125/02 |
| EP | 0 401 892 | 5/1990 | C09D/167/06 |
| EP | 0 540 884 A1 | 10/1992 | B05D/3/06 |
| EP | 0 594 068 | 10/1993 | C09D/201/02 |
| EP | 0 594 071 | 10/1993 | C09D/201/02 |
| EP | 0 594 142 | 10/1993 | C08L/57/12 |
| EP | 0 753 358 | 7/1996 | B05D/1/00 |
| EP | 0 844 286 A1 | 12/1997 | C09D/5/03 |
| EP | 0 940 459 A2 | 2/1999 | C09D/201/00 |
| GB | 1 583 412 | 8/1977 | C08F/226/02 |
| WO | WO 94/10211 | 5/1994 | C08F/8/30 |
| WO | WO 94/10212 | 5/1994 | C08F/8/30 |
| WO | WO 94/10213 | 5/1994 | C08F/8/30 |
| WO | WO 98/20047 | 5/1998 | C08F/2/06 |
| WO | WO 99/29754 * | 6/1999 | |
| WO | WO 02/10292 | 2/2002 | C09D/4/06 |
| WO | WO 02/074872 | 9/2002 | C09D/175/04 |

* cited by examiner

COATING MATERIAL THAT CAN BE CURED THERMALLY OR BY ACTINIC RADIATION, AND ITS USE

This application is a National Phase Application of Patent Application PCT/EP00/04807 filed on May 26, 2000.

The present invention relates to a novel coating material curable thermally and with actinic radiation. The present invention also relates to the use of the novel coating material for producing novel clearcoats and multicoat color and/or effect coating systems for automotive OEM finishing and refinish, industrial coating, including coil coating and container coating, the coating of plastics, and furniture coating.

Automobile bodies, plastic parts for automobiles or domestic appliances and industrial components are nowadays protected by a clearcoat. The clearcoat may be the only coating film used, or else may form the uppermost coat of a multicoat topcoat system.

Automobile bodies in particular are provided extensively with a multicoat topcoat system. Clearcoats are frequently applied as the final coat. Materials suitable for this purpose are the customary and known one-component (1K), two-component (2K), multicomponent (3K, 4K), powder clearcoat or powder slurry clearcoat materials, or UV-curable clearcoat materials.

One-component (1K), two-component (2K) or multicomponent (3K, 4K) clearcoat materials are described, for example, in the patents U.S. Pat. No. 5,474,811, U.S. Pat. No. 5,356,669, U.S. Pat. No. 5,605,965, WO 94/10211, WO 94/10212, WO 94/10213, EP 0 594 068 A1, EP 0 594 071 A1, EP 0 594 142 A1, EP 0 604 992 A1, WO 94/22969, EP 0 596 460 A1, and WO 92/22615.

Powder clearcoat materials are known, for example, from the German patent DE 42 22 294 A1 or from the BASF Lacke+Farben AG product information bulletin "Pulverlacke" [Powder coating materials], 1990.

A powder coating material which is curable thermally and with actinic radiation is known from the European patent EP 0 844 286 A1. It comprises an unsaturated binder and a second resin, copolymerizable with the first, and also a photoinitiator and a thermal initiator, and accordingly is curable thermally and with actinic radiation. However, this dual-cure powder coating material is used as a pigmented topcoat material, which is cured superficially with UV light and thermally in the regions close to the substrate. The patent does not reveal whether this known powder coating material is also suitable for producing clearcoats, especially in multicoat systems.

Powder slurry coating materials comprise powder coating materials in the form of aqueous dispersions. Slurries of this kind are described, for example, in the U.S. patent U.S. Pat. No. 4,268,542 and in the German patent applications DE 195 18 392.4 A1 and DE 196 13 547 A1, and in the German patent application DE 198 14 471.7 A1, which was unpublished at the priority date of the present specification.

UV-curable clearcoat materials are disclosed, for example, by the patents EP 0 540 884 A1, EP 0 568 967 A1 or U.S. Pat. No. 4,675,234 A1.

Each of these clearcoat materials has specific strengths and weaknesses. Using these clearcoat materials, multicoat systems are obtained which satisfy the optical requirements. However, the scratch-resistant one-component (1K) clearcoat materials are sometimes not sufficiently weather-resistant, whereas the weather-resistant two-component (2K) or multicomponent (3K, 4K) clearcoat materials are often not sufficiently scratch-resistant. Certain one-component (1K) clearcoat materials are indeed scratch-resistant and weather-stable but, in combination with frequently employed waterborne basecoat materials, exhibit surface defects such as shrinkage (wrinkling).

Powder clearcoat materials, powder slurry clearcoat materials, and UV-curabled clearcoat materials, on the other hand, exhibit a not entirely satisfactory intercoat adhesion, without offering a complete solution to the problems of scratch resistance or etch resistance. In particular, the severe polymerization shrinkage of the UV-curable clearcoat materials gives them a particular tendency towards delamination.

EP 0 568 967 A1 discloses a process for producing multicoat systems in which a thermally curable clearcoat film is applied by the wet-on-wet technique to a pigmented basecoat film, after which the two films are heat-cured together. Atop of the cured clearcoat there is subsequently applied at least one further clearcoat film, based on coating materials curable with actinic radiation, and curing is carried out with actinic radiation, or thermally and with actinic radiation. This process gives clearcoats of high chemical resistance and optical quality. However, the scratch resistance is not satisfactory.

Furthermore, EP 0 568 967 A1 discloses a process in which a coating material curable with actinic radiation is applied to the pigmented basecoat film and cured. Subsequently, a further coat of the same coating material is applied and is cured with actinic radiation. Although this results in a highly glossy surface without perceptible texture, the clearcoat in question yellows. Additionally, the scratch resistance still leaves something to be desired.

It is an object of the present invention to provide a novel coating material which no longer has the disadvantages of the prior art but which instead provides, simply, novel clearcoats and color and/or effect coating systems which exhibit no elimination of constituents on baking and which are scratch-resistant, stable to weather, free from yellowing, hard, flexible, and free from surface defects, which exhibit a high level of adhesion on all substrates, and which may be produced in the high coat thickness needed for an outstanding overall appearance.

The invention accordingly relates to a novel coating material curable thermally and with actinic radiation, comprising (a1) at least one constituent containing
(a11) at least two functional groups which serve for crosslinking with actinic radiation, and
(a12) at least one functional group which is able to undergo thermal crosslinking reactions with the hydroxyl and/or thiol groups (a21) in the constituent (a2), and (a2) at least one branched, cyclic and/or acyclic $C_9$–$C_{16}$ alkane functionalized with at least two hydroxyl or thiol groups or with at least one hydroxyl and at least one thiol group (a21).

In the text below, the novel coating material curable thermally and with actinic radiation is referred to as the "coating material of the invention".

In the text below, the branched, cyclic and/or acyclic $C_9$–$C_{16}$ alkanes (a2) for use in accordance with the invention that are functionalized with at least two hydroxyl or thiol groups or with at least one hydroxyl and at least one thiol group are referred to for short as "functionalized alkanes (a2)".

The invention further provides the novel clearcoats and multicoat color and/or effect coating systems which can be produced with the aid of the coating material of the invention.

In the text below, the novel clearcoats and multicoat color and/or effect coating systems are referred to as "clearcoat of the invention" and "multicoat systems of the invention", and the corresponding processes for producing them are referred to as "coating processes of the invention".

In the context of the present invention, the term "thermal curing" denotes the heat-initiated curing of a film of a coating material, in the context of which normally a separate crosslinking agent is employed. This is customarily referred to by those in the art as external crosslinking. Where the crosslinking agents are built into the binders, the term self-crosslinking is used. In accordance with the invention, external crosslinking is of advantage and is therefore employed with preference.

In the context of the present invention, actinic radiation means electron beams or, preferably, UV radiation. Curing by UV radiation is normally initiated by free-radical or cationic photoinitiators and in terms of its mechanism is a free-radical or cationic photopolymerization.

Where thermal curing and curing with actinic light are employed together for a coating material, the term "dual cure" is also used.

In the light of the prior art it was surprising and unforeseeable for the skilled worker that the object on which the invention is based might be achieved with the aid of the coating material of the invention, the coating process of the invention, and the clearcoat and multicoat systems of the invention.

A particular surprise is that use of the coating material of the invention results in clearcoat and multicoat systems of the invention which exhibit no elimination of constituents on baking and which not only are scratch-resistant, stable to weathering, free from yellowing, hard, flexible and free from surface defects, exhibit a high level of adhesion on all substrates and may be produced in the high coat thickness necessary for an outstanding overall visual impression, but also have extremely high reflow.

The basic material of the invention comprises at least one constituent (a1) containing at least two functional groups (a11) which serve for crosslinking with actinic radiation.

Examples of suitable functional groups (a11) are epoxide groups or olefinically unsaturated double bonds, as are present in vinyl, allyl, cinnamoyl, methacrylic or acrylic groups, especially methacrylic or acrylic groups. As is known, the epoxide groups are used for cationic photopolymerization, whereas the olefinically unsaturated double bonds are primarily suitable for free-radical photopolymerization. In accordance with the invention, the constituent (a1) may contain epoxide groups and olefinic double bonds, so that it may be subjected to crosslinking with actinic radiation in accordance with both mechanisms. It is, however, of advantage to use exclusively olefinically unsaturated double bonds, of the type specified, as functional group (a11).

The constituent (a1) for use in accordance with the invention further comprises at least one, preferably at least two functional groups (a12) which are able to undergo thermal crosslinking reactions with the hydroxyl and/or thiol groups (a21) of the constituent (a2) described below.

Examples of suitable functional groups (a12) are evident from the following overview.

Overview: Examples of complementary functional groups (a12) and (a22) in

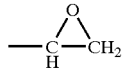

In the overview the radicals R denote aliphatic, cycloaliphatic, aromatic, aliphatic-cycloaliphatic, aliphatic-aromatic or cycloaliphatic-aromatic organic groups which if desired are substituted and/or contain heteroatoms such as oxygen, nitrogen and/or sulfur.

The selection of the groups (a21) is guided on the one hand by the consideration that they should not enter into any unwanted reactions initiated by actinic radiation and should not disrupt or inhibit curing with actinic radiation, and secondly by the temperature range within which thermal curing is to take place. In this context it is of advantage in accordance with the invention, especially with regard to heat-sensitive substrates such as plastics, to choose a temperature range which does not exceed 100° C., in particular 80° C. In the light of these boundary conditions, isocyanate groups (a12) have proven advantageous, and so are employed with preference in accordance with the invention.

Accordingly, the particularly advantageous constituent (a1) is an oligomeric or polymeric compound curable thermally or with actinic radiation which comprises at least one, preferably at least two and in particular at least three isocyanate groups (a12) and at least two and in particular at least three (meth)acrylic groups (a11).

In the context of the present invention, an oligomeric compound is a compound containing in general on average from 2 to 15 repeating basic structures or monomer units. A polymeric compound, in contrast, is a compound which generally contains on average at least 10 repeating basic structures or monomer units. Compounds of this kind are also referred to by those in the art as binders or resins.

In contradistinction thereto, a low molecular mass compound in the context of the present invention is a compound which derives substantially only from one basic structure or one monomer unit. Compounds of this kind are also referred to generally by those in the art as reactive diluents.

The polymers or oligomers used as constituent (a1) normally have a number-average molecular weight of from 500 to 50 000, preferably from 1000 to 5000. They preferably have a double bond equivalent weight of from 400 to 2000, with particular preference from 500 to 900. Furthermore, they have a viscosity at 23° C. of preferably from 250 to 11 000 mPas. They are employed preferably in an amount of from 5 to 90% by weight, with particular preference from, 10 to 80% by weight, and in particular from 15 to 70% by weight, based in each case on the overall amount of the coating material.

Examples of suitable constituents (a1) come from the oligomer and/or polymer classes of the linear or branched, especially the branched, (meth) acryl-functional (meth) acrylic copolymers, polyether acrylates, polyester acrylates, unsaturated polyesters, epoxy acrylates, urethane acrylates, amino acrylates, melamine acrylates, silicone acrylates, and the corresponding methacrylates. It is preferred to use binders (a1) which are free from aromatic structural units. Preference is therefore given to using urethane (meth) acrylates and/or polyester (meth)acrylates, with particular preference to urethane (meth)acrylates, with very particular preference aliphatic urethane (meth)acrylates, and especially urethane acrylates.

The urethane (meth)acrylates (a1) are obtained by reacting a diisocyanate and/or polyisocyanate, in particular a polyisocyanate, with a chain extender from the group of the diols/polyols and/or diamines/polyamines and/or dithiols/polythiols and/or alkanolamines and then reacting some of the free isocyanate groups with at least one hydroxyalkyl (meth)acrylate, especially a hydroxyalkyl acrylate. If desired, hydroxyalkyl esters of other ethylenically unsaturated carboxylic acids such as ethacrylic acid or itaconic acid may be used as well.

The amounts of chain extender, diisocyanate and/or polyisocyanate, and hydroxyalkyl ester in this case are preferably chosen so that 1.) the ratio of equivalents of the NCO groups to the reactive groups of the chain extender (hydroxyl, amino and/or thiol groups) is between 20:1 and 2:1, preferably between 15:1 and 5:1, and 2.) the OH groups of the hydroxyalkyl esters of the ethylenically unsaturated carboxylic acids are substoichiometric with regard to the remaining free isocyanate groups of the prepolymer formed from isocyanate and chain extender.

It is also possible to prepare the urethane (meth)acrylate (a1) by first reacting some of the isocyanate groups of a polyisocyanate with at least one hydroxyalkyl ester and then reacting some of the remaining isocyanate groups with a chain extender. In this case too the amounts of chain extender, isocyanate and hydroxyalkyl ester are chosen so that the ratio of equivalents of NCO groups to the reactive groups of the chain extender is between 20:1 and 2:1, preferably between 15:1 and 5:1, and the ratio of equivalents of the remaining NCO groups to the OH groups of the hydroxyalkyl ester is more than 1.

All of the forms lying between these two processes are of course also possible. Overall, it should be ensured that the ratio of isocyanate groups to isocyanate-reactive groups is sufficiently high that the resultant urethane (meth)acrylate (a1) possesses the desired number of isocyanate groups (a12).

In accordance with the invention the urethane (meth) acrylate (a1) contains on average at least one, preferably at least two, isocyanate group(s) (a12). Particular advantages result if there are on average more than two, with very particular preference more than three, isocyanate groups (a12). The number of isocyanate groups (a12) per [lacuna] need not exceed six on average in order to obtain the advantages of the invention. However, in specific cases an average of even more than six isocyanate groups (a12) per urethane (meth)acrylate (a1) is found advantageous.

Particular advantages result if the constituent (a1), especially the urethane (meth)acrylate (a1), has an isocyanate group (a12) content of from 7 to 20% by weight, with particular preference from 8 to 18% by weight, and in particular from 9 to 16% by weight, based in each case on the constituent (a1).

Examples of suitable diisocyanates and/or polyisocyanates are those described below in connection with the crosslinking agent (a7). For purposes of the preparation of the constituent (a1), especially the urethane (meth)acrylate (a1), the polyisocyanurates described at that point, containing isocyanurate groups, are of particular advantage and are therefore used with particular preference.

The coating material of the invention further comprises the functionalized alkanes (a2).

The functionalized alkanes (a2) are derived from branched, cyclic or acyclic alkanes having from 9 to 16 carbon atoms, which in each case form the parent structure.

Examples of suitable alkanes of this kind having 9 carbon atoms are 2-methyloctane, 4-methyloctane, 2,3-dimethylheptane, 3,4-dimethylheptane, 2,6-dimethylheptane, 3,5-dimethylheptane, 2-methyl-4-ethylhexane, and isopropylcyclohexane.

Examples of suitable alkanes of this kind having 10 carbon atoms are 4-ethyloctane, 2,3,4,5-tetramethylhexane, 2,3-diethylhexane, and 1-methyl-2-n-propylcyclohexane.

Examples of suitable alkanes of this kind having 11 carbon atoms are 2,4,5,6-tetramethylheptane and 3-methyl-6-ethyloctane.

Examples of suitable alkanes of this kind having 12 carbon atoms are 4-methyl-7-ethylnonane, 4,5-diethyloctane, 1'-ethylbutylcyclohexane, 3,5-diethyloctane, and 2,4-diethyloctane.

Examples of suitable alkanes of this kind having 13 carbon atoms are 3,4-dimiethyl-5-ethylnonane and 4,6-dimethyl-5-ethylnonane.

An example of a suitable alkane of this kind having 14 carbon atoms is 3,4-dimethyl-7-ethyldecane.

Examples of suitable alkanes of this kind having 15 carbon atoms are 3,6-diethylundecane and 3,6-dimethyl-9-ethylundecane.

Examples of suitable alkanes of this kind having 16 carbon atoms are 3,7-diethyldodecane and 4-ethyl-6-isopropylundecane.

Of these parent structures, the alkanes having from 10 to 14 and in particular 12 carbon atoms are particularly advantageous and are therefore used with preference. Of these, the octane derivatives in turn are especially advantageous.

For the present invention it is advantageous if the functionalized alkanes (a2) which derive from these branched, cyclic or acyclic alkanes as parent structures are liquid at room temperature. Accordingly, it is possible to use either individual liquid functionalized alkanes (a2) or liquid mixtures of these compounds. This is especially the case when using functionalized alkanes (a2) which, owing to their high number of carbon atoms in the alkane parent structure, are solid as individual compounds. The skilled worker will therefore be able to select the corresponding functionalized alkanes (a2) in a simple manner.

For the invention it is also advantageous for the functionalized alkanes (a2) to have a boiling point of more than 200, preferably 220, and in particular 240° C. Moreover, they should have a low evaporation rate.

For the coating materials of the invention it is of advantage if the functionalized alkanes (a2) are acyclic.

The functionalized alkanes (a2) have primary and/or secondary hydroxyl and/or thiol groups. For the coating materials of the invention it is of advantage if primary and secondary groups of this kind are present in one compound.

Accordingly, the functionalized alkanes (a2) comprise polyols, polythiols or polyol-polythiols (a2), but especially polyols (a2). These compounds may be used individually, or together as mixtures. Particular advantage arise if the polyols (a2) are diols and/or triols, but especially diols. They are therefore used with very particular preference.

Especially advantageous coating materials of the invention are obtained if the polyols (a2) are positionally isomeric dialkyloctanediols, especially diethyloctanediols. Outstanding results are obtained with 2,4-diethyl-1,5-octanediol.

The above-described functionalized alkanes (a2) are compounds known per se and may be prepared by means of customary and known synthesis methods of organic chemistry such as base-catalyzed aldol condensation, or they are obtained as byproducts of chemical industrial syntheses such as the preparation of 2-ethylhexanol.

The functionalized alkanes (a2) are generally present in the coating materials of the invention in an amount of from 5 to 60% by weight, based on the overall amount of the coating material in question. Although they may be present therein in greater amounts, the range indicated is an advantageous range within which the advantages of the invention are achieved reliably and securely. Within this range, that from 10 to 50% by weight is of particular advantage, since the coating materials of the invention which contain this amount of functionalized alkanes (a2) have a particularly advantageous profile of properties. Very particular advantages result, however, from the use of from 15 to 40% by weight of functionalized alkanes (a2).

In the coating material of the invention the ratio of isocyanate groups (a12) to the isocyanate-reactive groups (a21) may vary widely. It is guided in particular by the technical effects which have to be achieved with regard to the clearcoat and multicoat system of the invention. In accordance with the invention it is of advantage if the ratio (a12)/(a21) is between 2:1 and 1:2, with particular preference between 1.5:1 and 1:1.5.

The coating material for use in accordance with the invention may comprise at least one photoinitiator (a3). If the coating material or clearcoat film is to be crosslinked with UV radiation, the use of a photoinitiator (a3) is generally necessary. Where such initiators are used, they are present in the coating material in fractions of preferably from 0.1 to 10% by weight, [lacuna] from 1 to 8% by weight, and in particular from 2 to 6% by weight, based in each case on the overall amount of the coating material.

Examples of suitable photoinitiators (a3) are those of the Norrish II type, whose mechanism of action is based on an intramolecular variant of the hydrogen abstraction reactions as occur diversely in photochemical reactions (by way of example, reference may be made here to Römpp Chemie Lexikon, 9th expanded and revised edition, Georg Thieme Verlag, Stuttgart, Vol. 4, 1991) or cationic photoinitiators (by way of example, reference may be made here to Römpp Lexikon Lacke und Druckfarben, Georg Thieme Verlag Stuttgart, 1998, pages 444 to 446), especially benzophenones, benzoins or benzoin ethers, or phosphine oxides. It is also possible to use, for example, the products available commercially under the names Irgacure® 184, Irgacure® 1800 and Irgacure® 500 from Ciba Geigy, Grenocure® MBF from Rahn, and Lucirin® TPO from BASF AG.

Besides the photoinitiators (a3), customary sensitizers (a3) such as anthracene may be used in effective amounts.

Furthermore, the coating material may comprise at least one thermal crosslinking initiator (a4). At from 80 to 120° C., these initiators form radicals which start the crosslinking reaction. Examples of thermolabile free-radical initiators are organic peroxides, organic azo compounds or C—C-cleaving initiators such as dialkyl peroxides, peroxocarboxylic acids, peroxodicarbonates, peroxide esters, hydroperoxides, ketone peroxides, azo dinitriles or benzpinacol silyl ethers. C—C-cleaving initiators are particularly preferred, since their thermal cleavage does not produce any gaseous decomposition products which might lead to defects in the coating film. Where used, their amounts are generally from 0.1 to 10% by weight, preferably from 0.5 to 8% by weight, and in particular from 1 to 5% by weight, based in each case on the overall amount of the coating material.

Moreover, the coating material may comprise at least one reactive diluent (a5) curable thermally and/or with actinic radiation.

Examples of suitable thermally crosslinkable reactive diluents (a5) are oligomeric polyols which are obtainable from oligomeric intermediates, themselves obtained by metathesis reactions of acyclic monoolefins and cyclic monoolefins, by hydroformylation and subsequent hydrogenation; examples of suitable cyclic monoolefins are cyclobutene, cyclopentene, cyclohexene, cyclooctene, cycloheptene, norbonene or 7-oxanorbonene; examples of suitable acyclic monoolefins are contained in hydrocarbon mixtures obtained in petroleum processing by cracking ($C_5$ cut); examples of suitable oligomeric polyols for use in accordance with the invention have a hydroxyl number (OHN) of from 200 to 450, a number-average molecular weight Mn of from 400 to 1000, and a mass-average molecular weight Mw of from 600 to 1100.

Further examples of suitable thermally crosslinkable reactive, diluents (a5) are hyperbranched compounds containing a tetrafunctional central group, derived from ditrimethylolpropane, diglycerol, ditrimethlylolethane, pentaerythritol, tetrakis (2-hydroxyethyl)methane, tetrakis (3-hydroxypropyl)methane or 2,2-bishydroxymethyl-1,4-butanediol (homopentaerythritol). The preparation of these reactive diluents may take place in accordance with the customary and known methods of preparing hyperbranched and dendrimeric compounds. Suitable synthesis methods are described, for example, in the patents WO 93/17060 or WO 96/12754 or in the book by G. R. Newkome, C. N. Moorefield and F. Vögtle, Dendritic Molecules, Concepts, Syntheses, Perspectives, VCH, Weinheim, New York, 1996.

Further examples of suitable reactive diluents (a5) are polycarbonatediols, polyesterpolyols, poly(meth) acrylatediols or hydroxyl-containing polyaddition products.

Examples of suitable reactive solvents which may be used as reactive diluents (a5) are butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, trimethylolpropane, ethyl 2-hydroxypropionate or 3-methyl-3-methoxybutanol and also derivatives based on propylene glycol, e.g., ethoxyethyl propionate, isopropoxypropanol or methoxypropyl acetate.

As reactive diluents (a5) which may be crosslinked with actinic radiation, use is made, for example, of (meth)acrylic acid and esters thereof, maleic acid and its esters, including monoesters, vinyl acetate, vinyl ethers, vinylureas, and the like. Examples that may be mentioned include alkylene glycol di(meth)acrylate, polyethylene glycol di(meth) acrylate, 1,3-butandiol di(meth)acrylate, vinyl(meth) acrylate, allyl(meth)acrylate, glycerol tri(meth)acrylate, trimethylol-propane tri(meth)acrylate, trimethylolpropane di(meth)acrylate, styrene, vinyltoluene, divinylbenzene, pentaerythritol tri(meth)acrylate, pentaerythritol tetra(meth) acrylate, dipropylene glycol di(meth)acrylate, hexanediol di(meth)acrylate, ethoxyethoxyethyl acrylate, N-vinylpyrrolidone, phenoxyethyl acrylate, dimethylaminoethyl acrylate, hydroxyethyl (meth)acrylate, butoxyethyl acrylate, isobornyl(meth)acrylate, dimethylacrylamide and dicyclopentyl acrylate, the long-chain linear diacrylates described in EP 0 250 631 A1 having a molecular weight of from 400 to 4000, preferably from 600 to 2500. For example, the two acrylate groups may be separated by a polyoxybutylene structure. It is also possible to use 1,12-dodecyl diacrylate and the reaction product of 2 moles of acrylic acid with 1 mole of a dimer fatty alcohol having generally 36 carbon atoms. Also suitable are mixtures of the aforementioned monomers.

Preferred reactive diluents (a5) used include mono- and/or diacrylates, such as isobornyl acrylate, hexanediol diacrylate, tripropylene glycol diacrylate, Laromer® 8887 from BASF AG and Actilane® 423 from Akcros Chemicals Ltd., GB. Particular preference is given to using isobornyl acrylate, hexanediol diacrylate and tripropylene glycol diacrylate.

Where used, the reactive diluents (a5) are employed in an amount of preferably from 2 to 70% by weight, with particular preference from 10 to 65% by weight, and in particular from 15 to 50% by weight, based in each case on the overall amount of the coating material.

The coating material may further comprise at least one customary and known coatings additive (a6) in effective amounts, i.e., in amounts [lacuna] preferably up to 40% by weight, with particular preference up to 30% by weight, and in particular up to 20% by weight, based in each case on the overall amount of the coating material.

Examples of suitable coatings additives (a6) are

UV absorbers;

light stabilizers such as HALS compounds, benzotriazoles or oxalanilides;

free-radical scavengers;

crosslinking catalysts such as dibutyltin dilaurate or lithium decanoate;

slip additives;

polymerization inhibitors;

defoamers;

emulsifiers, especially nonionic emulsifiers such as alkoxylated alkanols and polyols, phenols and alkylphenols or anionic emulsifiers such as alkali metal salts or ammonium salts of alkanecarboxylic acids, alkanesulfonic acids, and sulfo acids of alkoxylated alkanols and polyols, phenols and alkylphenols;

wetting agents such as siloxanes, fluorine compounds, carboxylic monoesters, phosphoric esters, polyacrylic acids and their copolymers, or polyurethanes;

adhesion promoters such as tricyclodecane-dimethanol;

leveling agents;

film formation auxiliaries such as cellulose derivatives;

transparent fillers such as pyrogenic silica or nanoparticles based on silica; for further details, refer to Römpp Lexikon Lacke und Druckfarben, Georg Thieme Verlag, Stuttgart, 1998, pages 250 to 252;

flame retardants, and/or flatting agents.

Further examples, of suitable coatings additives (a6) are described in the textbook [Lackadditive Additives for coatings] by Johan Bieleman, Wiley-VCH, Weinheim, New York, 1998.

Not least, the coating material may comprise minor amounts of at least one thermally curable constituent (a7). In the context of the present invention, minor amounts are amounts which do not adversely affect the dual cure properties of the coating material but instead advantageously vary and supplement them. Where used, their fractions in the coating material should generally not exceed 40% by weight, preferably 35% by weight, and in particular 30% by weight.

Examples of suitable constituents (a7) are the crosslinking agents and binders known from the thermally curable coating materials.

Examples of suitable binders (a7) are linear and/or branched and/or block, comb and/or random poly(meth)acrylates or acrylate copolymers, polyesters, alkyds, amino resins, polyurethanes, polylactones, polycarbonates, polyethers, epoxy resin-amine adducts, (meth)acrylatediols, partially saponified polyvinyl esters or polyureas, of which the acrylate copolymers, the polyesters, the polyurethanes, the polyethers and the epoxy resin-amine adducts are advantageous.

Suitable binders (a7) are sold, for example, under the tradenames Desmophen® 650, 2089, 1100, 670, 1200 or 2017 by Bayer, under the trade names Priplas or Pripol® by Uniqema, under the trade names Cempol® polyester or polyacrylate-polyol by CCP, under the trade names Crodapol® 0-85 or 0-86 by Croda or under the trade name Formrez® ER417 by Witco.

Examples of suitable crosslinking agents (a7) are blocked diisocyanates and/or polyisocyanates.

Examples of suitable diisocyanates and/or polyisocyanates for the preparation of the blocked derivatives (a7) are organic polyisocyanates, especially those known as paint polyisocyanates, containing free isocyanate groups attached to aliphatic, cycloaliphatic, araliphatic and/or aromatic moieties. Preference is given to polyisocyanates containing from 2 to 5 isocyanate groups per molecule and having viscosities of from 100 to 10 000, preferably from 100 to 5000, and in particular from 1000 to 2000 mPas (at 23° C.). If desired, small amounts of organic solvent, preferably from 1 to 25% by weight based on straight polyisocyanate, may be added to the polyisocyanates in order to improve the ease of incorporation of the isocyanate and, where appropriate, to lower the viscosity of the polyisocyanate to a figure within the aforementioned ranges. Examples of suitable solvent additives [lacuna] the polyisocyanates are ethoxyethyl propionate, amyl methyl ketone, and butyl acetate. Moreover, the polyisocyanates may have been hydrophilically or hydrophobically modified in a customary and known manner.

Examples of suitable polyisocyanates are described, for example, in "Methoden der organischen Chemie", Houben-Weyl, Volume 14/2, 4th edition, Georg Thieme Verlag, Stuttgart 1963, pages 61 to 70, and by W. Siefken, Liebigs Annalen der Chemie, Volume 562, pages 75 to 136. Suitable examples include polyurethane prepolymers containing isocyanate groups, which may be prepared by reacting polyols with an excess of polyisocyanates and which are preferably of low viscosity.

Further examples of suitable polyisocyanates are polyisocyanates containing isocyanurate, biuret, allophanate, iminooxadiazinedone, urethane, urea and/or uretdione groups. Polyisocyanates containing urethane groups, for example, are obtained by reacting some of the isocyanate groups with polyols, such as trimethylolpropane and glycerol, for example. It is preferred to use aliphatic or cycloaliphatic polyisocyanates, especially hexamethylene diisocyanate, dimerized and trimerized hexamethylene diisocyanate, isophorone diisocyanate, 2-isocyanatopropylcyclohexyl isocyanate, dicyclohexylmethane 2,4'-diisocyanate, dicylohexylmethane 4,4'-diisocyanate or 1,3-bis(isocyanatomethyl)cyclohexane, diisocyanates derived from dimer fatty acids, as sold under the commercial designation DDI 1410 by Henkel, 1,8-diisocyanato-4-isocyanatomethyloctane, 1,7-diisocyanato-4-isocyanatomethylheptane or 1-isocyanato-2-(3-isocyanatopropyl)cyclohexane, or mixtures of these polyisocyanates.

Very particular preference is given to using mixtures of polyisocyanates containing uretdione and/or isocyanurate groups and/or allophanate groups and based on hexamethylene diisocyanate, as are formed by catalytic oligomerization of hexamethylene diisocyanate using appropriate catalysts. The polyisocyanate constituent may otherwise consist of any desired mixtures of the free polyisocyanates exemplified above.

Examples of suitable blocking agents are the blocking agents known from the U.S. patent U.S. Pat. No. 4,444,954, such as i) phenols such as phenol, cresol, xylenol, nitrophenol, chlorophenol, ethylphenol, t-butylphenol, hydroxybenzoic acid, esters of this acid, or 2,5-di-tert-butyl-4-hydroxytoluene;

ii) lactams, such as ε-caprolactam, δ-valerolactam, γ-butyrolactam or β-propiolactam;

iii) active methylenic compounds, such as diethyl malonate, dimethyl malonate, ethyl acetoacetate or methyl acetoacetate, or acetylacetone;

iv) alcohols such as methanol, ethanol, n-propanol, isopropanol, n-butanol, isobutanol, t-butanol, n-amyl alcohol, t-amyl alcohol, lauryl alcohol, ethylene glycol monomethyl ether, ethylene glycol monoethyl ether, ethylene glycol monobutyl ether, diethylene glycol monomethyl ether, diethylene glycol monoethyl, ether, propylene glycol monomethyl ether, methoxymethanol, glycolic acid, glycolic esters, lactic acid, lactic esters, methylolurea, methylolmelamine, diacetone alcohol, ethylenechlorohydrin, ethylenebromohydrin, 1,3-dichloro-2-propanol, 1,4-cyclohexyldimethanol or acetocyanohydrin;

v) mercaptans such as butyl mercaptan, hexyl mercaptan, t-butyl mercaptan, t-dodecyl mercaptan, 2-mercaptobenzothiazol, thiophenol, methylthiophenol or ethylthiophenol;

vi) acid amides such as acetoanilide, acetoanisidinamide, acrylamide, methacrylamide, acetamide, stearamide or benzamide;

vii) imides such as succinimide, phthalimide or maleimide;

viii) amines such as diphenylamine, phenylnaphthylamine, xylidine, N-phenylxylidine, carbazole, aniline, naphthylamine, butylamine, dibutylamine or butylphenylamine;

ix) imidazoles such as imidazole or 2-ethylimidazole;

x) ureas such as urea, thiourea, ethyleneurea, ethylenethiourea or 1,3-diphenylurea;

xi) carbamates such as phenyl N-phenylcarbamate or 2-oxazolidone;

xii) imines such as ethyleneimine;

xiii) oximes such as acetone oxime, formaldoxime, acetaldoxime, acetoxime, methyl ethyl ketoxime, diisobutyl ketoxime, diacetyl monoxime, benzophenone oxime or chlorohexanone oximes;

xiv) salts of sulfurous acid such as sodium bisulfite or potassium bisulfite;

xv) hydroxamic esters such as benzyl methacrylohydroxamate (BMH) or allyl methacrylo-hydroxamate; or xvi) substituted pyrazoles, ketoximes, imidazoles or triazoles; and also mixtures of these blocking agents, especially dimethylpyrazole and triazoles, malonic esters and acetoacetic esters, or dimethylpyrazole and succinimide.

As crosslinking agents (a7) it is also possible to use tris(alkoxycarbonylamino)triazines of the general formula 5

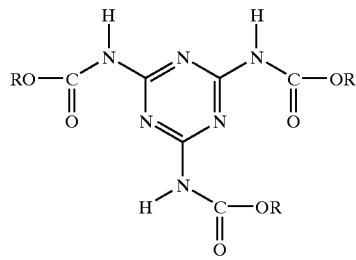

Examples of suitable tris(alkoxycarbonylamino)triazines (a7) are described in the patents U.S. Pat. No. 4,939,213, U.S. Pat. No. 5,084,541 or EP 0 624 577 A1. Use is made in particular of the tris(methoxy-, tris(butoxy- and/or tris(2-ethylhexoxycarbonylamino)triazines.

Of advantage are the methyl butyl mixed esters, the butyl 2-ethylhexyl mixed esters, and the butyl esters. These have the advantage over the straight methyl ester of better solubility in polymer melts, and also have less of a tendency to crystallize.

Particularly suitable for use as crosslinking agents (a7) are amino resins, examples being melamine resins. In this context it is possible to use any amino resin suitable for transparent topcoat or clearcoat materials, or a mixture of such amino resins. Especially suitable are the customary and known amino resins some of whose methylol and/or methoxymethyl groups have been defunctionalized by means of carbamate or allophanate groups. Crosslinking agents of this kind are described in the patents U.S. Pat. No. 4,710,542 and EP 0 245 700 B1 and also in the article by B. Singh and coworkers, Carbamylmethylated Melamines, Novel Crosslinkers for the Coatings Industry, in Advanced Organic Coatings Science and Technology Series, 1991, Volume 13, pages 193 to 207. Furthermore, the amino resins may also be used as binders (a11) in the base paint (A1).

Further examples of suitable crosslinking agents (a7) are beta-hydroxyalkylamides such as N,N,N',N'-tetrakis(2-hydroxyethyl)adipamide or N,N,N',N'-tetrakis(2-hydroxypropyl)adipamide.

Further examples of suitable crosslinking agents (a7) are siloxanes, especially siloxanes containing at least one trialkoxy- or dialkoxysilane group.

Further examples of suitable crosslinking agents (a7) are polyanhydrides, especially polysuccinic anhydride.

The coating material of the invention may further comprise organic solvents (a8) which do not react with isocyanate groups. Particularly suitable such solvents include esters, ketones, keto esters, glycol ethers such as ethylene, propylene or butylene glycol ethers, glycol esters such as ethylene, propylene or butylene glycol esters, or glycol ether esters such as ethoxyethyl propionate and isopropbxypropanol. Also suitable are aliphatic and aromatic solvents such as dipentene, xylene or Shellsol®.

The coating material for use in accordance with the invention may be present in different forms.

Thus, given an appropriate choice of its above-described constituents, it may be present as a liquid coating material which is substantially free from organic solvents. However, the coating material may comprise a solution or dispersion of the above-described constituents in organic solvents (a8). It is a further advantage of the coating material of the invention that in this case solids contents of up to more than 80% by weight, based on the coating material, may be set.

Furthermore, given an appropriate choice of its above-described constituents, the coating material may be a powder clearcoat material. For this purpose the constituent (a1) is advantageously microencapsulated. This powder clearcoat material may then be dispersed, if desired, in water to give a powder slurry clearcoat material.

Advantageously, the coating material of the invention is a two-component or multicomponent system in which at least the constituent (a1) is stored separately from the other constituents and is not added to them until shortly before use. In this case, the coating material of the invention may also be aqueous, the constituent (a1) preferably being present in a component comprising a solvent (a8).

The coating material of the invention is used to produce the clearcoats and multicoat systems of the invention on primed or unprimed substrates.

Suitable coating substrates in this context are all surfaces which are amenable to combined curing with the use of heat and actinic radiation; examples include metals, plastics, wood, ceramic, stone, textile, leather, glass, glass fibers, glass wool and rock wool, mineral- and resin-bound building materials, such as, plasterboard and cement slabs or roof tiles. Accordingly, the coating material of the invention is also suitable for applications outside of automotive finishing, especially for the coating of furniture and for industrial coating, including coil coating and container coating. In the context of the industrial coatings it is suitable for coating virtually all parts for private or industrial use, such as radiators, domestic appliances, small metal parts, hubcaps or wheel rims.

Using the coating material of the invention it is also possible in particular to coat primed or unprimed plastics such as, for example, ABS, AMMA, ASA, CA, CAB, EP, UF, CF, MF, MPF, PF, PAN, PA, PE, HDPE, LDPE, LLDPE, UHMWPE, PET, PMMA, PP, PS, SB, PUR, PVC, RF, SAN, PBT, PPE, POM, PUR-RIM, SMC, BMC, PP-EPDM and UP (abbreviations in accordance with DIN 7728T1). The plastics to be coated may of course also be polymer blends, modified plastics or fiber reinforced plastics. The coating material may also be employed to coat plastics commonly used in vehicle construction, especially motor vehicle construction. Unfunctionalized and/or nonpolar substrate surfaces may be subjected prior to coating in a known manner to a pretreatment, such as with a plasma or by flaming.

In the context of the coating process of the invention it is possible here to apply one or more clearcoat(s). Where two or more clearcoats are applied, coating materials of the invention having different physical compositions may be used. In the great majority of cases, however, the desired profile of properties of the clearcoats and multicoat systems of the invention is achieved with one clearcoat.

The clearcoat is applied in a wet film thickness such that after curing, in the finished clearcoats and multicoat systems of the invention, the seal has a dry film thickness of from 10 to 100, preferably from 15 to 75, with particular preference from 20 to 55, and in particular from 20 to 35 $\mu$m.

The application of the coating material of the invention for the purpose of producing the clearcoat film may take place by any customary application method, such as spraying, knifecoating, brushing, flowcoating, dipping or rolling, for example. It is preferred to employ spray application methods, such as compressed air spraying, airless spraying, high-speed rotation, electrostatic spray application (ESTA), for example, alone or in conjunction with hot spray applications such as hot air spraying, for example.

Application may take place at temperatures of max. 70 to 80° C., so that appropriate application viscosities are attained without any change or damage to the coating material and its overspray (which may be intended for reprocessing) during the short period of thermal stress. For instance, hot spraying may be configured in such a way that the coating material is heated only very briefly in the spray nozzle or shortly before the spray nozzle.

The spray booth used for application may, for example, be operated with a circulation system, which may be temperature-controllable, and which is itself operated with an appropriate absorption medium for the overspray, an example of such medium being the coating material of the invention itself.

Application is preferably made under illumination with visible light having a wavelength of more than 550 $\mu$m, or in the absence of light. This prevents physical damage or change to the coating material and the overspray.

Of course, the above-described application methods may also be employed in producing the basecoat of the multicoat systems of the invention, as part of the coating process of the invention.

In accordance with the invention, following its application the clearcoat film is cured thermally and with actinic radiation.

Curing may take place after a certain rest period. This period may have a duration of from 30 s to 2 h, preferably from 1 min to 1 h, and in particular from 1 min to 30 min. The rest period is used, for example, for leveling and devolatilization of the clearcoat film or for the evaporation of volatile constituents such as solvents, water or carbon dioxide if the coating material has been applied using supercritical carbon dioxide as solvent. The rest period may be shortened and/or assisted by the use of elevated temperatures of up to 80° C., provided this does not entail any damage or alteration to the clearcoat film, such as premature crosslinking, for instance.

In accordance with the invention, curing with actinic radiation takes place with UV radiation or electron beams. If desired, it may be carried out or supplemented by actinic radiation from other sources. In the case of electron beams, it is preferred to operate under an inert gas atmosphere. This may be ensured, for example, by supplying carbon dioxide and/or nitrogen directly to the surface of the clearcoat film.

In the case of curing with UV radiation it is also possible to operate under inert gas in order to prevent the formation of ozone.

Curing with actinic radiation is carried out using the customary and known radiation sources and optical auxiliary measures. Examples of suitable radiation sources are high or low pressure mercury vapor lamps, with or without lead doping in order to open up a radiation window of up to 385 nm, or electron beam sources. The arrangement of these sources is known in principle and may be adapted to the circumstances of the workpiece and the process parameters. In the case of workpieces of complex shape, as are envisaged for automobile bodies, the regions not accessible to direct radiation (shadow regions) such as cavities, folds and other structural undercuts may be (partially) cured using pointwise, small-area or all-round emitters, in conjunction with an automatic movement means for the irradiation of cavities or edges.

During the curing of the film(s) present on the substrate and comprising the coating material of the invention, the substrate may be at rest or may be passed in front of the actinic radiation source at an appropriate speed. If the substrate is moved, a speed of advance in the range from from 1 to 10 m/min, with particular preference from 2 to 8 m/min, and in particular from 3 to 6 m/min, is found advantageous. In this case the UV lamps have a preferred output of from 100 to 200 W/cm, with particular preference from 120 to 190 W/cm, and in particular from 140 to 180 W/cm. Irrespective of whether the substrate is moved or is at rest, a radiation dose that proves advantageous is a dose in the range from 500 to 5000 mJ/cm$^2$, with particular preference from 1000 to 4500 mJ/cm$^2$, and in particular from 1500 to 4000 mJ/cm$^2$.

The equipment and conditions of [lacuna] these curing methods are described, for example, in R. Holmes, U.V. and E.B. Curing Formulations for Printing Inks, Coatings and Paints, SITA Technology, Academic Press, London, United Kingdom 1984.

Curing here may take place in stages, i.e., by multiple exposure to light with actinic radiation. It may also be carried out alternatingly, i.e., by curing alternately with UV radiation and electron beams.

The thermal curing as well has no special features in terms of its methodology but instead takes place in accordance with the customary and known methods such as heating in a forced air oven or irradiation with IR lamps. As with actinic radiation curing, thermal curing may also be carried out in stages. Thermal curing takes place advantageously at a temperature of from 50 to 100° C., with particular preference from 80 to 100° C., and in particular from 90 to 100° C., for a period of from 1 min up to 2 h, with particular preference from 2 min up to 1 h, and in particular from 3 to 30 min. Where the substrates used are able to withstand high thermal loads, thermal crosslinking may also be carried out at temperatures above 100° C. In this case it is generally advisable not to exceed temperatures of 180° C., preferably 160° C., and in particular 140° C.

Thermal curing and curing with actinic radiation are employed together. These methods may be used simultaneously or in alternation. Where the two curing methods are used in alternation, it is possible for example to begin with thermal curing and to end with curing with actinic radiation. In other cases it may prove advantageous to begin and to end with actinic radiation curing. The skilled worker is able to determine the method of curing most advantageous for the case in hand on the basis of his or her general knowledge in the art, possibly with the assistance of simple preliminary tests. In the great majority of cases it is found advantageous first to carry out curing with actinic radiation and then to carry out thermal curing.

The clearcoats of the invention may also be part of the multicoat systems of the invention.

For this purpose, the coating material of the invention is applied by the coating process of the invention not to the primed or unprimed substrates but instead to at least one color and/or effect basecoat film which is situated thereon and comprises a pigmented coating material curable thermally and also, where appropriate, with actinic radiation.

In accordance with the invention it is of advantage to apply the coating materials of the invention by the wet-on-wet technique to the dried or flashed-off, but not fully cured, basecoat film, after which the resultant clearcoat film and the basecoat film are cured together thermally and with actinic radiation.

Suitable coating materials for producing the basecoat film include the customary and known basecoat materials, especially aqueous basecoat materials.

Examples of suitable aqueous basecoat materials are known from the patents EP 0 089 497 A1, EP 0 256 540 A1, EP 0 260 447 A1, EP 0 297 576 A1, WO 96/12747, EP 0 523 610 A1, EP 0 228 003 A1, EP 0 397 806 A1, EP 0 574 417 A1, EP 0 531 510 A1, EP 0 581 211 A1, EP 0 708 788 A1, EP 0 593 454 A1, DE 43 28 092 A1, EP 0 299 148 A1, EP 0 394 737 A1, EP 0 590 484 A1, EP 0 234 362 A1, EP 0 234 361 A1, EP 0 543 817 A1, WO 95/14721, EP 0 521 928 A1, EP 0 522 420 A1, EP 0 522 419 A1, EP 0 649 865 A1, EP 0 536 712 A1, EP 0 596 460 A1, EP 0 596 461 A1, EP 0 584 818 A1, EP 0 669 356 A1, EP 0 634 431 A1, EP 0 678 536 A1, EP 0 354 261 A1, EP 0 424 705 A1, WO 97/49745, WO 97/49747, EP 0 401 565 A1, EP 0 730 613 B1 or WO 95/14721.

The clearcoats and multicoat systems of the invention exhibit excellent scratch resistance, intercoat adhesion, weathering stability and chemical stability, an outstanding profile of optical properties, and extremely high reflow.

EXAMPLE 1

The Production of a Multicoat System of the Invention

A commercial primer-surfacer from BASF Coatings AG was applied first of all, using a gravity-feed gun, to steel panels coated cathodically with a commercially customary electrodeposition coating material (electrocoat having a film thickness of 18–22 μm), and baked. This gave a primer-surfacer coat with a film thickness of from 35 to 40 μm. Thereafter, for the purpose of better assessing the optical properties of the clearcoat film of the invention, the primer-surfacer was overcoated with a black aqueous basecoat material from BASF Coatings AG, which was dried initially at 80° C. for 10 minutes. This aqueous basecoat material was applied in a wet film thickness such that following its complete curing the resulting dry film thickness was from 13.5 to 15 μm.

Applied wet-on-wet to the basecoat film was a coating material curable thermally and with actinic radiation, in a wet film thickness such that full curing of the clearcoat film resulted in a film thickness of 35 μm. The coating material consisted of 136 parts by weight of an aliphatic urethane acrylate based on the isocyanurate of hexamethylene diisocyanate, which contains 12.5% by weight of isocyanate groups and had an average acrylate group functionality of 3.5, 47.9 parts by weight of 2,4-diethyl-1,5-octanediol, 13.6 parts by weight of a commercial photoinitiator (Irgacure® 184 from CIBA AG), 1.36 parts by weight of a commercially customary silicone-based leveling agent, 1.36 parts by weight of a commercial defoamer (BYK® 020 from Byk) and 20 parts by weight of butyl acetate.

Following a rest period of 6 min, the resultant basecoat film and clearcoat film were cured at 50° C. with UV radiation (3000 mJ/cm$^2$) and then baked at 160° C. for 45 min.

The adhesion of the multicoat system of the invention was determined following 24 hours of storage at room temperature in accordance with the cross-cut test to DIN 53151 (2 mm) [ratings 0 to 5]. There was no delamination: rating GT0.

The scratch resistance of the multicoat system on the test panels was assessed following two weeks of storage at room temperature by means of the BASF brush test described in FIG. 2 on page 28 of the article by P. Betz and A. Bartelt, Progress in Organic Coatings, 22 (1993), pages 27–37, albeit with modification in respect of the weight used (2000 g instead of the 280 g specified therein), assessment taking place as follows: In the test, the film surface was damaged using a mesh fabric loaded with a mass. The mesh fabric and the film surface were wetted copiously with a laundry detergent solution. The test panel was moved back and forward under the mesh fabric in reciprocal movements by means of a motor drive.

The test element was an eraser (4.5×2.0 cm, broad side perpendicular to the direction of scratching) covered with nylon mesh fabric (no. 11, 31 μm mesh size, Tg 50° C.). The applied weight was 2000 g.

Prior to each test the mesh fabric was replaced, with the running direction of the fabric meshes parallel to the direction of scratching. Using a pipette, approximately 1 ml of a freshly stirred 0.25% strength Persil solution was applied in front of the eraser. The rotary speed of the motor was adjusted so that 80 double strokes were performed within a period of 80 s. After the test, the remaining washing liquid was rinsed off with cold tap water and the test panel was blown dry using compressed air. The gloss for DIN 67530 was measured before and after damage (measurement direction perpendicular to the direction of scratching), and gave the following results:

| Initial gloss | 86 |
| Gloss after exposure | 63 |
| Gloss after storage at 60° C. for 2 hours | 83 |

The results evidence the good scratch resistance and extremely high reflow of the multicoat system of the invention.

In terms of its chemical resistance, the multicoat system of the invention corresponded to the multicoat systems produced with the aid of customary and known two-component (2k) clearcoat materials.

What is claimed is:

1. A coating material curable thermally and with actinic radiation, comprising
    (a1) at least one constituent comprising
        (a11) at least two functional groups which serve for crosslinking with actinic radiation, and
        (a12) at least one functional group which is able to undergo thermal crosslinking reactions with the hydroxyl and/or thiol groups (a21) in the constituent (a2) and is at least one of

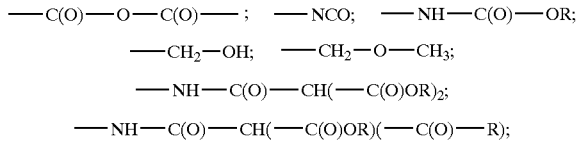

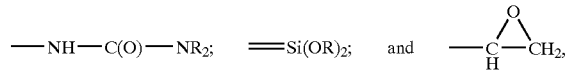

and
    (a2) at least one branched, cyclic and/or acyclic $C_9$–$C_{16}$ functionalized alkane comprising at least two functional groups (a21) selected from the group consisting of hydroxyl groups, thiol groups, and mixtures thereof.

2. The coating material of claim 1, further comprising at least one member selected from (a3) at least one photoinitiator, (a4) at least one thermal crosslinking initiator, (a5) at least one reactive diluent curable thermally and/or with actinic radiation, (a6) at least one coatings additive, (a7) at least one thermally curable constituent, (a8) at least one organic solvent, and mixtures thereof.

3. The coating material of claim 1, wherein functional groups (a11) comprise at least one group selected from olefinically unsaturated groups, epoxide groups, and mixtures thereof, and functional groups (a12) comprise isocyanate groups.

4. The coating material of claim 1, wherein constituent (a1) comprises at least one member selected from a urethane (meth)acrylate, a polyester (meth)acrylate, or mixtures thereof.

5. The coating material of claim 1, wherein functionalized alkane (a2) is liquid at room temperature.

6. The coating material of claim 1, wherein functionalized alkane (a2) has a boiling point of over 200° C.

7. The coating material of claim 1, wherein functionalized alkane (a2) is acyclic.

8. The coating material of claim 1, wherein functionalized alkane (a2) comprises primary and/or secondary hydroxyl and/or thiol groups.

9. The coating material of claim 1, wherein functionalized alkane (a2) comprises primary and secondary hydroxyl and/or thiol groups.

10. The coating material of claim 1, wherein functionalized alkane (a2) is a polyol (a2).

11. The coating material of claim 10, characterized in that the polyols (a2) are diols and/or triols (a2).

12. The coating material of claim 11, characterized in that the polyols (a2) are positionally isomeric dialkyloctanediols.

13. The coating material of claim 12, characterized in that the polyols (a2) are positionally isomeric diethyloctanediols.

14. The coating material of claim 12, characterized in that the polyol (a2) comprises 2,4-diethyl-1,5-octanediol.

15. A process of coating a substrate comprising applying to a substrate the coating material of claim 1.

16. The process of claim 15 wherein the applied coating material is at least one coating selected from a basecoat or a clearcoat.

17. The process of claim 15 wherein the substrate is an automotive part, an article or component of furniture, a coil, or a container.

* * * * *